UNITED STATES PATENT OFFICE.

HANS MARCUSSEN HØYBERG, OF FREDERIKSBERG, NEAR COPENHAGEN, DENMARK.

METHOD OF AND SOLUTION FOR ASCERTAINMENT OF THE QUANTITY OF FAT IN CREAM.

1,357,168.   Specification of Letters Patent.   Patented Oct. 26, 1920.

No Drawing.   Application filed January 26, 1920. Serial No. 354,217.

*To all whom it may concern:*

Be it known that I, HANS MARCUSSEN HØYBERG, a subject of the King of Denmark, residing at Frederiksberg, near Copenhagen, Denmark, have invented new and useful Improvements in Methods of and Solution for Ascertainment of the Quantity of Fat in Cream; and I do hereby declare the following to be a full, clear, and exact description of the same.

In my prior specification (application Serial Number 286,997 filed on April 2nd 1919, now Patent 1,329,183) I have indicated a method of ascertainment of the quantity of fat in milk and cream, and according to the method indicated in the said specification it is necessary to dilute the cream in ordinary manner with water in a certain proportion prior to the analysis.

The invention aims at altering the method of analysis and the solution used for the purpose containing potassium sodium tartrate and an alkali metal hydroxid as a solvent for the casein in such a manner that the diluting of the cream is avoided, which means the saving of an operation on the careful execution of which the exactness of the result is contingent. Therefore it is of essential importance for the practical use of the method in dairies and similar places that this one measuring is avoided. This end is attained by preparing one of the used liquids in a concentration adapted for the purpose.

An analysis of cream according to the invention is effected in the following manner.

A solution of 50–70 g. of sodium hydroxid and 70–130 g. of potassium sodium tartrate in one liter of water is prepared. In an ordinary cream butyrometer are mixed 5 parts of cream with 6.5 parts of the above named solution and 0.46 part of ordinary technical isobutyl alcohol, whereupon the butyrometer is closed and deposited in a water-bath at a temperature of 60–70° C. for 15–20 minutes, whereafter the quantity of fat is read off directly from the butyrometer glass.

Having thus fully described my invention I claim as new and desire to secure by Letters Patent:

1. Method of ascertainment of the quantity of fat in undiluted cream, consisting in mixing 5 volumes of cream with 6.5 volumes of a solution containing 50–70 g. sodium hydroxid and 70–130 g. potassium sodium tartrate in one liter and 0.46 volume of isobutyl alcohol in a butyrometer glass, leaving the mixture for 15–20 minutes in water-bath at a temperature of 60–70° C. and reading off the quantity of fat directly from the butyrometer glass.

2. An aqueous solution for use in estimation of the percentage of fat in undiluted cream containing 50–70 g. sodium hydroxid and 70–130 g. potassium sodium tartrate in one liter of water.

In testimony whereof I have affixed my signature in presence of two witnesses.

HANS MARCUSSEN HØYBERG.

Witnesses:
 VIGGO BLOM,
 S. CHRISTAFFERSEN.